United States Patent Office.

EDWIN CHESTERMAN, OF TREMONT, NEW YORK.

*Letters Patent No. 97,880, dated December 14, 1869; antedated November 17, 1869.*

IMPROVEMENT IN THE MANUFACTURE OF RUBBER SPONGE.

The Schedule referred to in these Letters Patent and making part of the same

*To all whom it may concern:*

Be it known that I, EDWIN CHESTERMAN, of Tremont, in the county of Westchester, and State of New York, have invented a new and useful Artificial Sponge; and I do hereby declare the following to be a full and correct description of the same.

The nature of the invention consists in the production of an artificial sponge, having the desirable qualities of natural sponge, but possessing greater durability and applicability to a larger range of purposes, by grinding together sulphurized rubber, dissolved by heat, and certain deliquescent or soluble solids, and certain liquids, either or both, with such pigment as may be required to give color to the product, and then moulding, and more or less completely vulcanizing it, and finishing it for market, all as hereinafter more fully set forth.

My process of manufacture is as follows:

Rubber, sulphurized in the ordinary way, is ground on hot rollers or calenders, together with salt, salts of soda, alum, or other deliquescent or soluble solid, not affected by moderate heat, either with or without an admixture of such liquids as molasses, solution of soda, &c., the proportions of the other substances to the rubber, and the use or omission of the liquids, depending upon the particular qualities intended to be imparted to the manufactured article. It may be stated, as a rule governing the choice and proportions of the materials, that the coarser the sponge is required to be, the greater must be the quantity of solids employed; the finer the sponge, the larger the proportion of liquids; and the harder or more non-absorbent the sponge, the smaller must be the quantity of both solids and liquids, in proportion to that of the sulphurized rubber. Color is imparted to the sponge by the use of the golden sulphuret of antimony, or other suitable pigment, ground with the other ingredients on the hot rollers until the whole mass is rendered thoroughly homogeneous. When reduced to this state, it is pressed or rolled into any required shape, and vulcanized or partly vulcanized, in any known manner. The pieces are then trimmed and subjected to heat in a water or other bath, under pressure or otherwise, by which means the size or bulk of the sponge is increased. The degree of heat employed, and the period of exposure vary with the quality of the article to be produced. For a fine sponge, the temperature does not require to be so high, nor the exposure so prolonged, as in the case of a coarser article.

For the bath above referred to, I have used water, salt water, or the solutions of carbonate or nitrate of soda, muriate of lime, bisulphate of soda, carbonate or nitrate of ammonia, &c., but I do not wish to confine myself to either one of these.

In some cases, I revulcanize the sponge by this bath-process, so as to make it retain its extended form; but when I require a finer sponge, both as to color and texture, I do not subject it, in the bath, to sufficient heat to revulcanize it, but, after removing it from the bath, expose it to a strong, dry heat, or steam heat, and thus revulcanize it in its extended form.

The sponge is now taken out, cut to any size required, and washed in a solution of soda or potash, which cleanses it from unpleasant smell and gives it a slight contraction or set. It is then perfumed in the usual manner and is ready for use.

Sponge made by this process possesses all the desirable qualities of the finest natural sponge. It is perfectly free from grit, can be made of any size or shape, and of any degree of fineness and strength, and can be used for many purposes to which, owing to its friability, natural sponge would not be applicable. Its cleansing-quality, moreover, to whatever purpose applied, is greater than that of any material in use, and it can itself be readily cleansed from any impurities acquired in using.

I am aware that sugar and other kindred materials have been used before to make spongy rubber. But they have invariably been used with rubber dissolved by a chemical solvent and mixed in a vessel, and not ground on the mill with hot rollers without a solvent. No one, to my knowledge, has before combined solids and liquids with rubber to form an artificial sponge, or has worked either or both into the rubber by grinding on the mill with hot rollers and without a solvent.

I am also aware that rubber containing an admixture of salts and other solids, has before been vulcanized; but I believe no one, before my invention, ever vulcanized or partly vulcanized rubber, and afterward swelled or extended it, and then set it to its enlarged form.

The artificial sponge heretofore made of rubber, although porous and spongy in appearance, does not possess much capillary or absorbent power. This is indicated by the fact that it does not readily take up water from a flat surface. My sponges are much larger in proportion to the quantity of rubber used than those heretofore made, and hence are more absorbent and less costly.

Having thus fully described my invention,

What I claim, and desire to secure by Letters Patent, is—

1. Treating a rubber compound that has been more or less perfectly vulcanized in a hot-water, steam, or other bath, for the purpose of increasing its volume, as described.

2. Setting or fixing a rubber compound that has been extended in volume by the process last above named, by vulcanizing the same in its extended form, for the purpose set forth.

3. The use of golden sulphuret of antimony incorporated with the compound from which the artificial sponge is made, in the manner and for the purpose specified.

4. An artificial sponge, made by incorporating into a homogeneous mass, on hot rollers, the ingredients hereinbefore mentioned, and afterward expanding, revulcanizing, and "setting" the same, in the manner described.

The above specification of my said invention signed and witnessed, at New York, this 22d day of April, A. D. 1869.

EDWIN CHESTERMAN.

Witnesses:
JOSEPH C. WAMBOLD,
M. C. LEFFERTS.